(12) United States Patent
Patel et al.

(10) Patent No.: US 7,941,023 B2
(45) Date of Patent: May 10, 2011

(54) ULTRA LOW-LOSS CMOS COMPATIBLE SILICON WAVEGUIDES

(75) Inventors: Vipulkumar Patel, Breinigsville, PA (US); David Piede, Allentown, PA (US); Margaret Ghiron, Allentown, PA (US); Prakash Gothoskar, Allentown, PA (US)

(73) Assignee: Lightwire Inc., Allentown, PA (US)

( * ) Notice: Subject to any disclaimer, the term of this patent is extended or adjusted under 35 U.S.C. 154(b) by 268 days.

(21) Appl. No.: 11/890,123

(22) Filed: Aug. 3, 2007

(65) Prior Publication Data

US 2007/0280616 A1    Dec. 6, 2007

Related U.S. Application Data

(63) Continuation of application No. 11/314,305, filed on Dec. 21, 2005, now abandoned.

(60) Provisional application No. 60/638,216, filed on Dec. 21, 2004.

(51) Int. Cl.
*G02B 6/10* (2006.01)
(52) U.S. Cl. ........................................................ 385/129
(58) Field of Classification Search .................... 385/129
See application file for complete search history.

(56) References Cited

U.S. PATENT DOCUMENTS

| | | | | |
|---|---|---|---|---|
| 4,997,246 | A * | 3/1991 | May et al. | 385/2 |
| 5,631,766 | A * | 5/1997 | Venhuizen et al. | 359/328 |
| 5,838,870 | A | 11/1998 | Soref | 385/131 |
| 6,063,299 | A | 5/2000 | Drake et al. | |
| 6,231,771 | B1 | 5/2001 | Drake | |
| 6,316,281 | B1 | 11/2001 | Lee et al. | |
| 6,597,852 | B2 | 7/2003 | Kling | |
| 6,850,683 | B2 | 2/2005 | Lee et al. | |
| 7,088,890 | B2 * | 8/2006 | Liu | 385/43 |
| 2003/0021568 | A1 | 1/2003 | Samara-Rubio et al. | 385/132 |
| 2003/0059190 | A1 * | 3/2003 | Gunn et al. | 385/130 |
| 2003/0068131 | A1 * | 4/2003 | Gunn, III | 385/40 |
| 2005/0158002 | A1 | 7/2005 | Kubby et al. | |

* cited by examiner

*Primary Examiner* — Uyen-Chau N Le
*Assistant Examiner* — Hoang Tran
(74) *Attorney, Agent, or Firm* — Wendy W. Koba

(57) ABSTRACT

A low loss optical waveguiding structure for silicon-on-insulator (SOI)-based arrangements utilizes a tri-material configuration including a rib/strip waveguide formed of a material with a refractive index less than silicon, but greater than the refractive index of the underlying insulating material. In one arrangement, silicon nitride may be used. The index mismatch between the silicon surface layer (the SOI layer) and the rib/strip waveguide results in a majority of the optical energy remaining within the SOI layer, thus reducing scattering losses from the rib/strip structure (while the rib/strip allows for guiding along a desired signal path to be followed). Further, since silicon nitride is an amorphous material without a grain structure, this will also reduce scattering losses. Advantageously, the use of silicon nitride allows for conventional CMOS fabrication processes to be used in forming both passive and active devices.

5 Claims, 7 Drawing Sheets

ULTRA LOW-LOSS CMOS COMPATIBLE SILICON WAVEGUIDES

CROSS-REFERENCE TO RELATED APPLICATION

The present application is a continuation of U.S. application Ser. No. 11/314,305 filed Dec. 21, 2005, now abandoned which claims the benefit of U.S. Provisional Application No. 60/638,216, filed Dec. 21, 2004.

TECHNICAL FIELD

The present invention relates to the formation of low loss silicon optical waveguides in a silicon-on-insulator (SOI) structure and, more particularly, to the inclusion of a rib/slab of a CMOS-compatible material having a refractive index intermediate that of silicon and silicon dioxide to achieve the desired lower loss.

BACKGROUND OF THE INVENTION

The optical waveguides typically formed in SOI-based structures comprise silicon (with a refractive index of approximately 3.47), the silicon formed in a "slab", "rib" or "strip" geometry on the surface of the SOI substrate. A strip waveguide typically comprises crystalline silicon, where crystalline silicon is known to exhibit less loss that a polysilicon form of the same material. However, strip waveguides tend to exhibit relatively high optical loss through their (relatively rough) sidewalls, which serve as scattering surfaces for a propagating optical signal. That is, since an etching process is used to form the sidewalls of the strip, the etchant tends to roughen the exposed sidewall surfaces. Any geometry that introduces sharp corners in the strip waveguide also serves to introduce scattering centers and increase optical loss.

A "rib" waveguide structure conventionally comprises a polysilicon rib formed over the surface silicon layer (often referred to as the "SOI layer") in SOI-based applications. The bulk losses of polysilicon are greater than that of crystalline silicon, resulting in higher optical losses along the rib waveguide.

One prior art attempt to address the loss experienced by these optical waveguides is discussed in U.S. Pat. No. 6,850,683, issued to K. K. Lee et al. on Feb. 1, 2005. In the Lee et al. arrangement, a post formation oxidation process is used at a high temperature to smooth the rough sidewalls of a silicon waveguide. While this method is somewhat successful in reducing scattering losses, it cannot be used in applications involving "active" waveguide structures, since such a high temperature process will result in unwanted dopant migration within the SOI layer.

An alternative method of creating low loss silicon waveguides is disclosed in U.S. Patent Application Publication 2005/0158002, published for J. A. Kubby et al. on Jul. 21, 2005. In the Kubby et al. arrangement, a silicon nitride cladding layer is formed over a silicon rib waveguide to entrap the propagating optical signal and minimize scattering losses through the sidewalls of the rib structure.

SUMMARY OF THE INVENTION

The need remaining in the prior art is addressed by the present invention, which relates to the formation of low loss silicon optical waveguides in a silicon-on-insulator (SOI) structure and, more particularly, to the inclusion of a rib/slab of a CMOS-compatible material having a refractive index intermediate that of silicon and silicon dioxide to achieve the desired lower loss.

In accordance with the present invention, a rib/slab of a material having a refractive index less than that of silicon, but greater than that of silicon dioxide is formed over a portion of the surface SOI layer of a SOI-based structure. In a preferred embodiment, silicon nitride may be used as this material (inasmuch as it is particularly well-suited for CMOS-based fabrication processes). The thickness of the rib/slab is controlled as a trade-off between optical coupling into the rib/slab and optical loss. By virtue of using a material with a refractive index less than that of silicon, the contrast in refractive index helps in confining the majority of the optical signal within the SOI layer, thus significantly reducing optical loss through the rib/slab portion of the waveguide.

Since silicon nitride is an amorphous material (as are other appropriate semiconductor materials, such as SiON and SiC), scattering losses through rib sidewalls of such a structure are significantly less than in the prior art silicon structure. The formation of such a rib/slab uses straightforward CMOS fabrication processes, various dopants may first be deposited within the SOI layer and will not migrate within SOI layer during deposition of the overlying rib/slab structure.

Other and further aspects and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
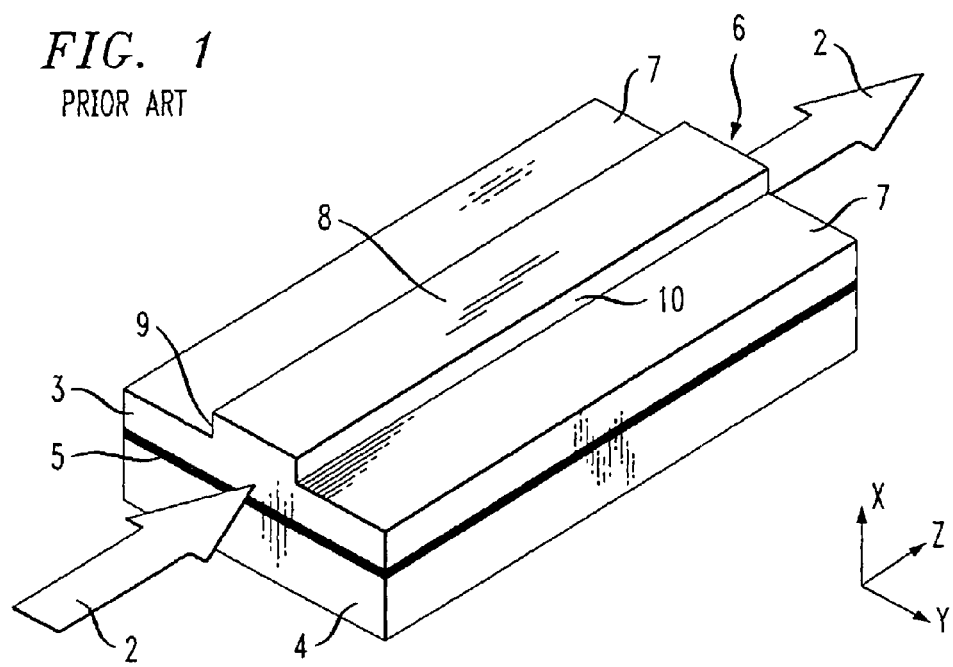
FIG. 1 illustrates, in an isometric view, a prior art silicon rib waveguide arrangement.

FIG. 1 illustrates an SOI-based silicon rib waveguide structure 1 as typical in the prior art. The longitudinal z-axis indicates the direction of light propagation, indicated by arrows 2, with the transverse y-direction and x-direction referred to as the "horizontal" and "vertical" directions, respectively. Silicon rib waveguide structure 1 generally consists of a relatively thin single crystal silicon surface layer 3 (generally referred to hereinafter as the "SOI layer") bonded to a relatively thick silicon substrate 4, with an isolation layer 5 therebetween (thus forming the silicon-on-insulator (SOI) structure). Rib structure 6 is generally fabricated by reactive ion etching (RIE) a pair of parallel trenches 7 in SOI layer 3. Rib structure 6 is defined as having a top surface 8 and opposing sidewalls 9, 10. The optical mode profile O is also shown in FIG. 1. As mentioned above, the use of an etching technique to create sidewalls 9 and 10 results in allowing a significant portion of the traveling optical beam 2 to "leak" through the sidewalls prior to exiting waveguide structure 1.

In some cases, when forming a rib waveguide, polysilicon is generally used to form the rib structure. For situations where low optical loss is desired, polysilicon is not well-suited since it experiences relatively high levels of optical loss.

Figure 2:
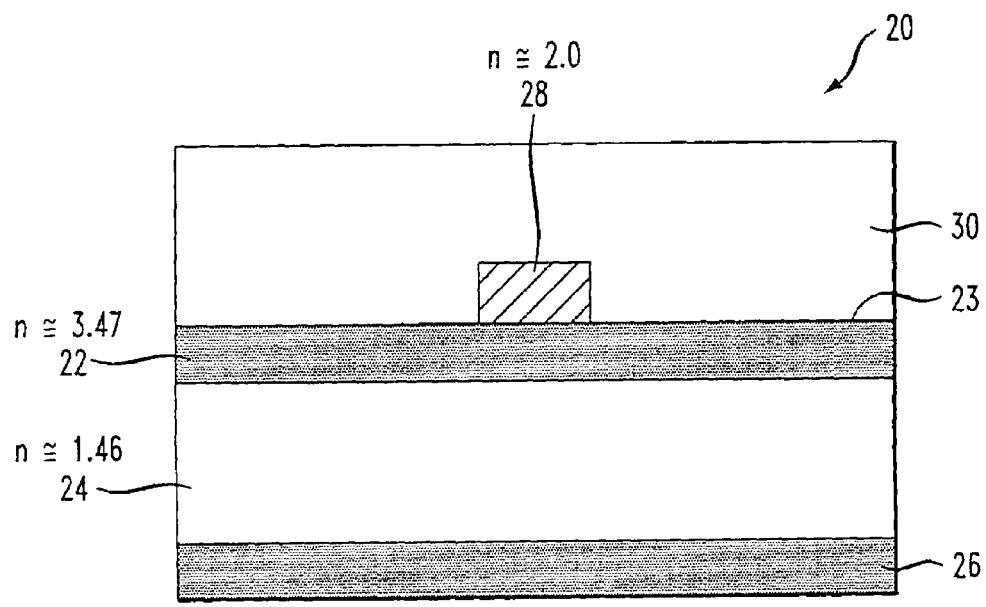
FIG. 2 is a cut-away side view of a first embodiment of a tri-material rib waveguide structure formed in accordance with the present invention.

In accordance with the present invention, the use of a pure silicon material to form the rib/slab portion of an optical waveguide is replaced with an alternative material that is compatible with conventional CMOS processing and exhibits a refractive index intermediate that of silicon (approximately 3.47) and silicon dioxide (approximately 1.46). FIG. 2 contains a side view of a first embodiment of the present invention, illustrating an SOI-based, low loss optical waveguiding structure 20. Optical waveguiding structure 20, similar to the prior art arrangement described above, comprises an SOI layer 22, an isolating layer 24 and a silicon substrate 26. In most cases, SOI layer 22 comprises a thickness of less than one micron so as to support the transmission of a single mode optical signal. The refractive index of SOI layer 22 is thus approximately 3.47 and the refractive index of the underlying oxide layer is approximately 1.46. In accordance with the present invention, a rib waveguiding structure 28 of a third material is disposed over a portion of the top surface 23 of SOI layer 22, where the semiconductor material used to form rib waveguiding structure 28 is selected to have a refractive index between the oxide and silicon values of 1.46 and 3.47. That is, 1.46<refractive index of rib $28 \leq 3.47$. One material that satisfies this criteria is silicon nitride (SiN), which has a refractive index of approximately 2.0 and is a conventional material often used in CMOS process. Other suitable materials include, but are not limited to, SiON and SiC.

For the purposes of the present discussion, reference will be made to the formation of a silicon nitride rib waveguide or slab waveguide. This reference is merely for the purpose of simplifying the discussion of the present invention and should not be considered to limit the scope of the various materials that may be used within the tri-layer structure of the present invention. Layer 30 is disposed to surround rib waveguide 28, as well as the exposed surface 23 of SOI layer 22. In accordance with the present invention, layer 30 is formed to comprise a material with a refractive index less than that of rib waveguide 28. In most cases, an oxide (such as silicon dioxide) will be used to form layer 30.

As mentioned above, a significant aspect of the present invention is the index mis-match between SOI layer 22 and rib waveguide 28. As a result, a majority of the optical energy will remain within SOI layer 22 (although guided along the waveguiding structure formed by the patterning of rib 28). Therefore, the opportunity for leakage of optical signal through sidewalls 27 and 29 of rib 28 are significantly reduced over the prior art structure. Moreover, inasmuch as silicon nitride (or any other suitable material) is an amorphous material with no grain structure, scattering losses along sidewalls 27 and 29 will be minimal. The use of a lower refractive index material also enables the use of wider waveguides that retain single mode operation. This also reduces sidewall losses since the optical intensity at the sidewalls is significantly reduced when compared to silicon single mode waveguides.

Figure 3:
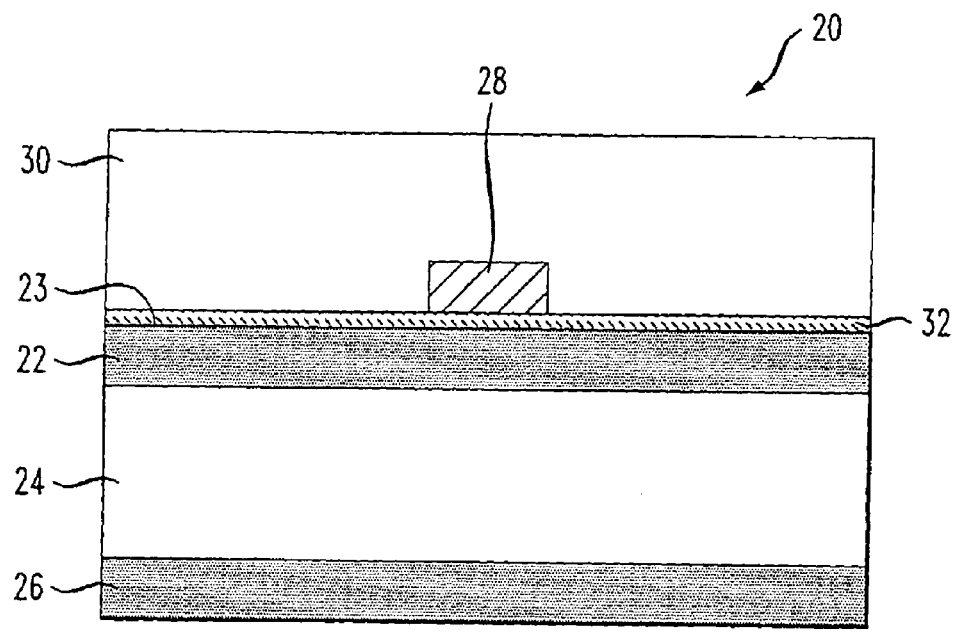
FIG. 3 contains a variation of the arrangement of FIG. 2, with the inclusion of a relatively thin gate oxide layer between the SOI layer and the rib waveguide structure.

FIG. 3 illustrates a slight variation of the arrangement of FIG. 2, where a relatively thin oxide layer 32 is formed between rib waveguide structure 28 and SOI layer 22. The thickness of oxide layer 32 (such as a relatively thin gate oxide), is not considered to significantly reduce the optical coupling between rib 28 and SOI layer 22. Oxide layer 32 is important in the formation of active optical devices using the inventive structure. Additionally, the oxide material functions as an etch stop for CMOS processing operations.

Figure 4:
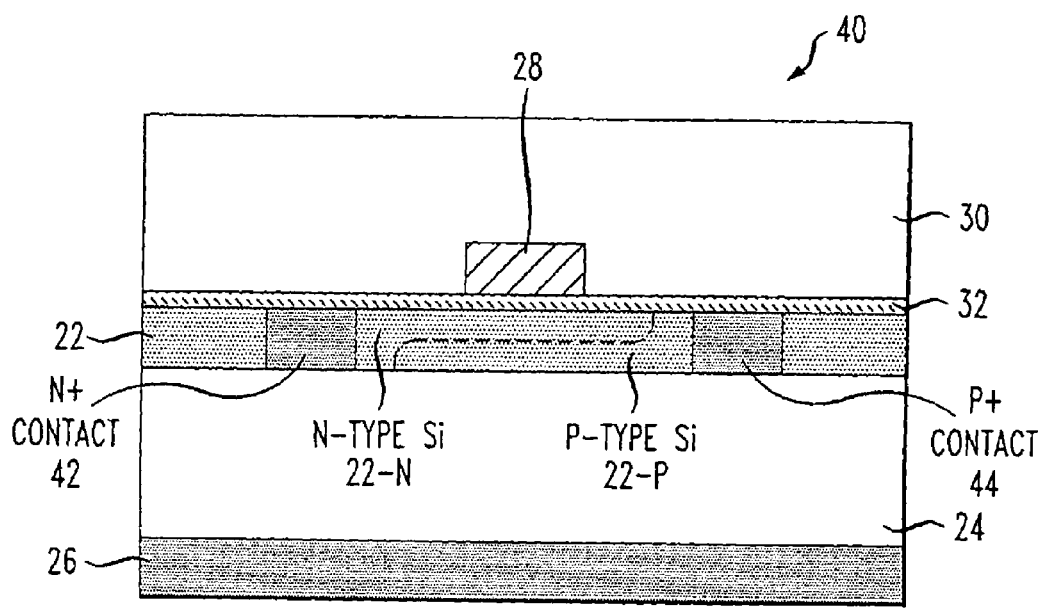
FIG. 4 illustrates a cut-away side view of an exemplary active optical device structure formed in accordance with the present invention, where SOI layer has been doped in appropriate regions to form an active device.

As mentioned above, an advantage of the CMOS-compatible structure of the present invention is that dopants may be included within SOI layer 22 to form active optical devices, without the problem of dopant migration associated with prior art structures that utilized thermal post-processing. FIG. 4 illustrates one such active optical device 40, where the portion of SOI layer 22 underlying SiN rib 28 is doped to include an N-type region (denoted 22-N) and a P-type region (denoted 22-P). A first contact 42 is formed within SOI layer 22 to provide electrical contact to N-type region 22-N and a second contact 44 is formed within a spaced-apart area of SOI layer 22 to provide electrical contact to P-type region 22-P. Dotted line 46 is used to define the partition between region 22-N and 22-P. In this case, the regions are formed to overlap horizontally, with extended areas in the regions adjacent to their respective contacts. In one example, conventional CMOS processing may be used to form silicide regions for contacts 42 and 44. Alternatively, regions 42 and 44 may comprise heavily-doped silicon areas (as compared with the more lightly-doped regions 22-N and 22-P).

Figure 5:
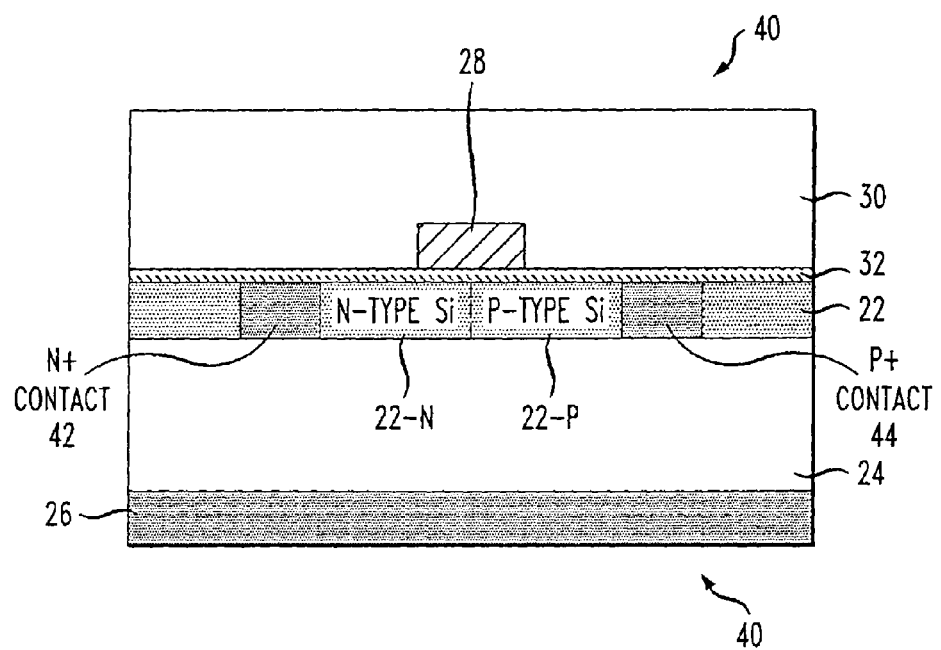
FIG. 5 illustrates an alternative to the arrangement of FIG. 4, where the doped regions are formed as contiguous vertical areas within the SOI layer.

Advantageously, there is no need to structural transition regions between active and passive optical devices using the arrangement of the present invention, allowing for various monolithic structures incorporating both passive and active devices (as well as electronic devices) to be formed. The doping profile for regions 22-N and 22-P (as well as the placement of contacts 42 and 44) may be optimized on a case-by-case basis, as function of the desired speed and optical loss requirements. FIG. 5 is a side view of an alternative active optical device structure, where in this case doped regions 22-N and 22-P are formed as adjacent regions, divided by a vertical partition 48. The remaining layers and materials are essentially the same as discussed above with respect to FIG. 4.

Figure 6:
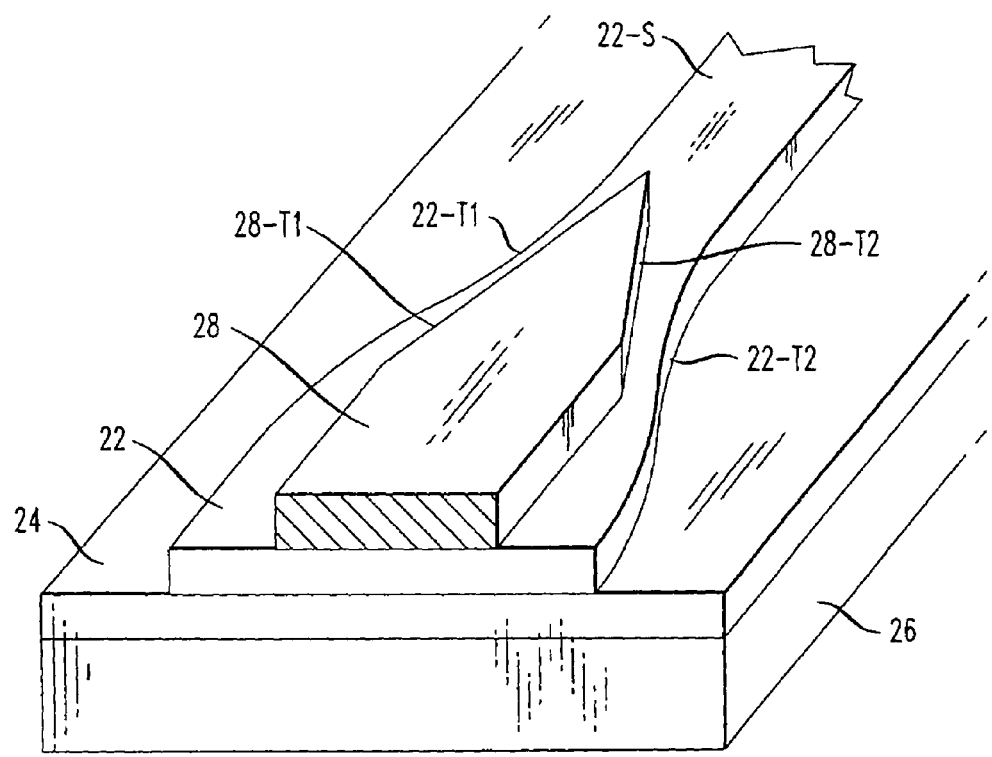
FIG. 6 is an isometric view of another embodiment of the present invention, where the rib waveguide structure is formed to include a tapered region to facilitate the coupling of optical signals between the combination rib/SOI layer and the SOI layer itself.
Figure 7:
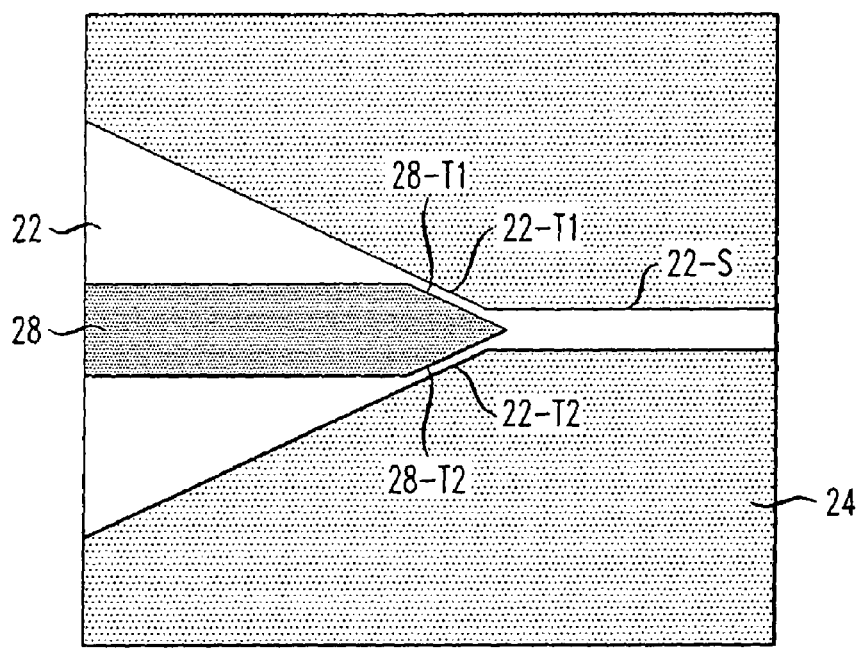
FIG. 7 is a top view of the arrangement of FIG. 6.

An advantage of using a CMOS-compatible material to form the rib waveguiding structure of the present invention is that conventional processes (patterning, etching, etc.) may be used to modify the geometry of the rib waveguide for various purposes. FIG. 6 is an isometric view (and FIG. 7 a top view) of one exemplary arrangement. It is to be understood that many other variations are also possible. Referring to FIG. 6, SOI layer 22 is shown as being etched to create a strip waveguiding area, denoted 22-S. A pair of tapers 22-T1 and 22-T2 (shown best in FIG. 7) are used to narrow SOI layer 22 into strip 22-S while also preventing back reflections of the propagating optical signal. In order to provide efficient coupling of the propagating optical signal from the layered combination of SiN rib 28/SOI layer 22, rib 28 is also tapered as shown so as to focus the optical energy into the central region of the structure and thus couple efficiently into silicon strip waveguide 22-S. The tapered sidewalls of SiN rib 28 being denoted as 28-T1 and 28-T2 in FIGS. 6 and 7. Well-known patterning and etching techniques may be used to form these etched structures. In a further embodiment (not shown), silicon strip 22-T may thereafter comprise an overlying polysilicon layer (taper), thus forming a "poly-loaded" SOI structure as known in the art.

Figure 8:
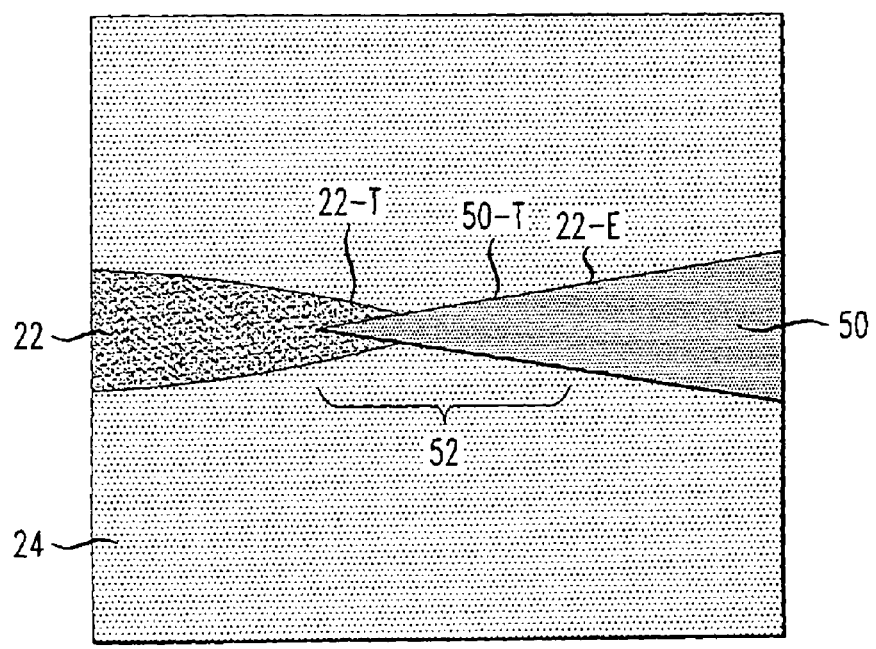
FIG. 8 is a top view of yet another embodiment of the present invention, where a propagating optical signal is coupled with low loss between the SOI layer and a tapered rib structure formed of a material such as silicon nitride.

FIG. 8 contains a top view of an alternative embodiment of the present invention, this particular embodiment including a slab waveguiding structure 50 of an intermediate index material (such as, for example, SiN, SiON or SiC). In this particular embodiment, SOI layer 22 is formed as including an inward taper 22-T, terminating at an endpoint 22-E, as shown. Waveguide structure 50 (for example, an SiN waveguide) is also formed as a taper 50-T, expanding from an endpoint 50-E, and disposed so as to form an overlapping region 52 with SOI layer 22. The tapers provide for minimal reflections, while allowing the propagating optical signal to couple with low loss between SOI layer 22 and SiN strip waveguide 50.

Figure 9:
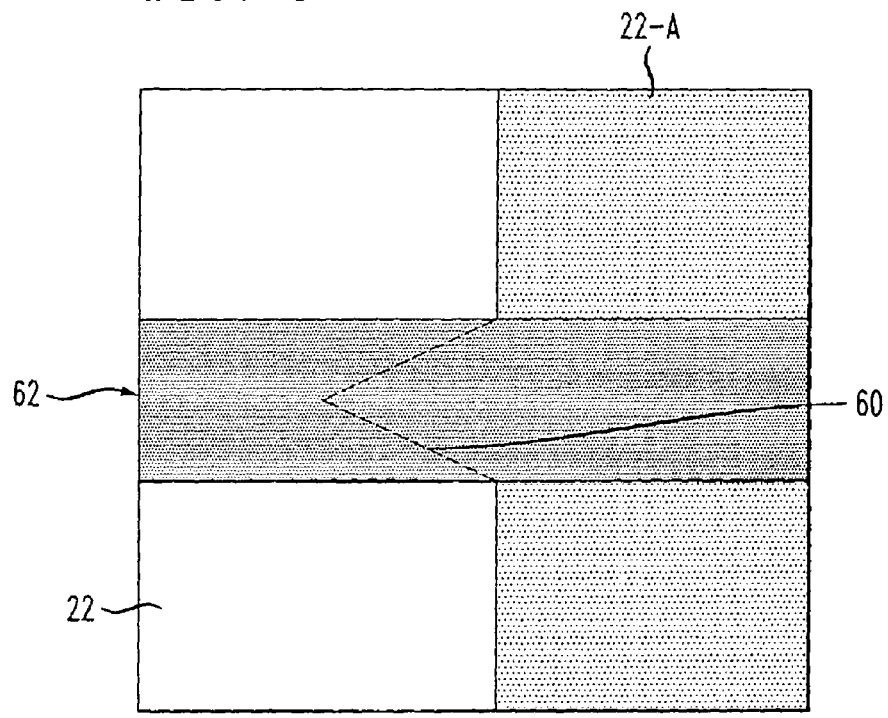
FIG. 9 is a top view of another embodiment of the present invention, where the doping within the surface SOI layer is controlled to provide a tapered transition between a passive device region and an active device region.
Figure 10:
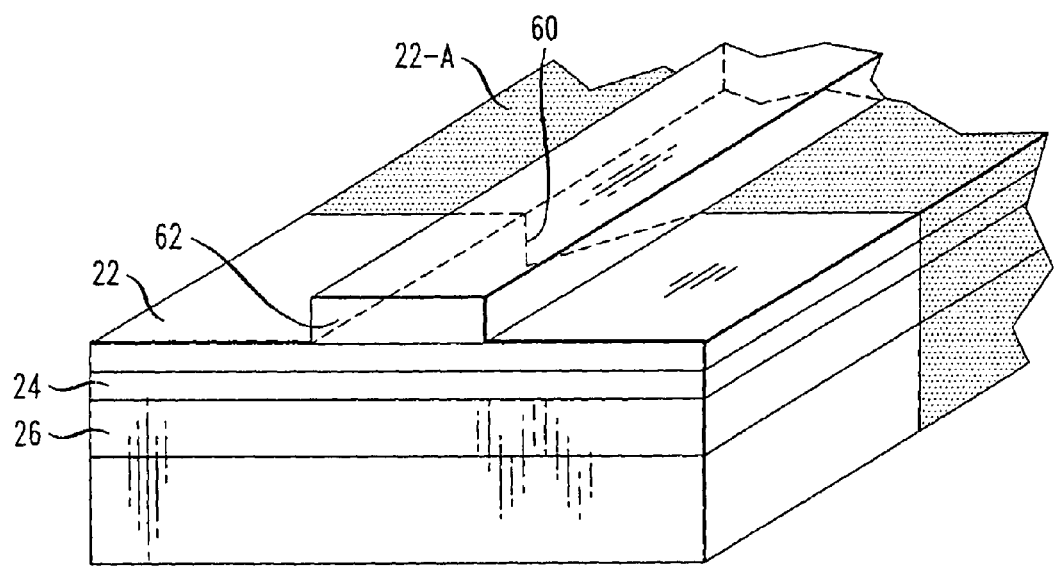
FIG. 10 is an isometric view of the embodiment of FIG. 9.

The doping profile within SOI layer 22 itself may be used to form a pseudo-taper and minimize the presence of optical reflections within a structure formed in accordance with the present invention. FIG. 9 is a top view and FIG. 10 an isometric view, of an exemplary structure of the present invention where the doping profile within SOI layer 22 is controlled to minimize reflections. A region of SOI layer 22 denoted 22-A has been doped in a manner required to form active optical devices, as previously discussed. In this particular embodiment of the present invention, the doping profile is controlled to provide for a tapered transition between the passive area of SOI layer 22 and active area 22-A. In particular, a region 60 is defined as essentially a "wedge" of dopant at the interface between active device region 22-A and the passive region, with wedge 60 disposed directly under SiN rib waveguiding structure 28. FIG. 10 illustrates this particular arrangement in an isometric view.

Figure 11:
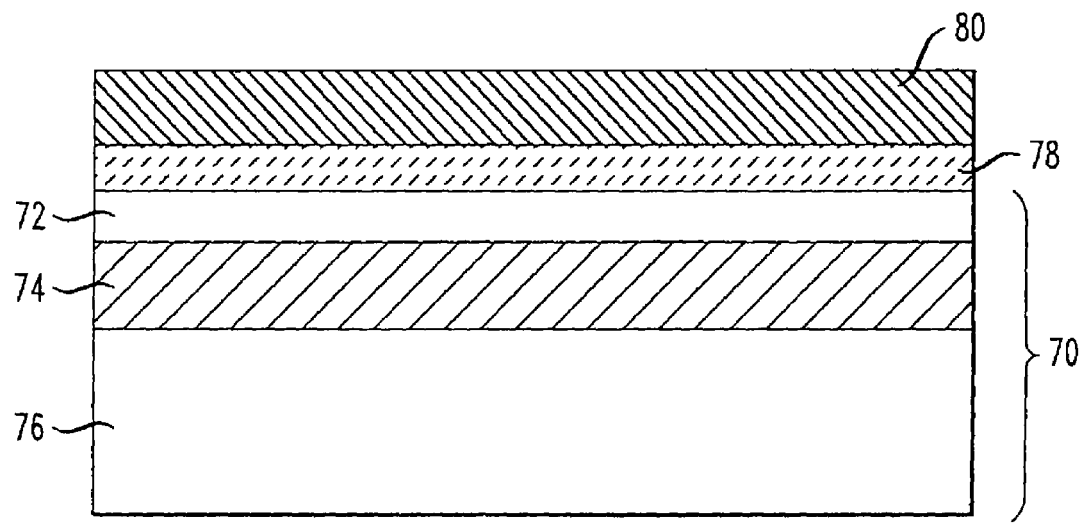
FIGS. 11-14 illustrate a set of process steps useful in forming a low loss rounded profile SOI layer rib waveguide in accordance with the present invention.

In another method of reducing optical loss within a rib structure, the SOI layer itself may be "rounded" into a rib structure, using the fabrication steps as shown in FIGS. 11-14. In general, a rounded rib structure with smooth surfaces and dimensions matching the optical mode profile will result in an ultra low loss waveguide structure, since scattering losses from the rough sidewalls of prior art structures are minimized by the rounding. FIG. 11 illustrates an exemplary starting configuration for forming a rounded, low loss optical rib waveguide structure within an SOI-based structure 70. Advantageously, the rounded waveguide surface is extremely smooth as it is fabricated using an oxidation process without the need for any etching operations. Structure 70 includes a surface SOI layer 72, buried oxide layer 74 and silicon substrate 76. A relatively thick oxide layer 78 is first formed over SOI layer 72, where a thermal oxidation process may be used to form oxide layer 78. An oxide-resistant layer 80 is then formed over oxide layer 78, where silicon nitride may be used to form layer 80.

Figure 12:
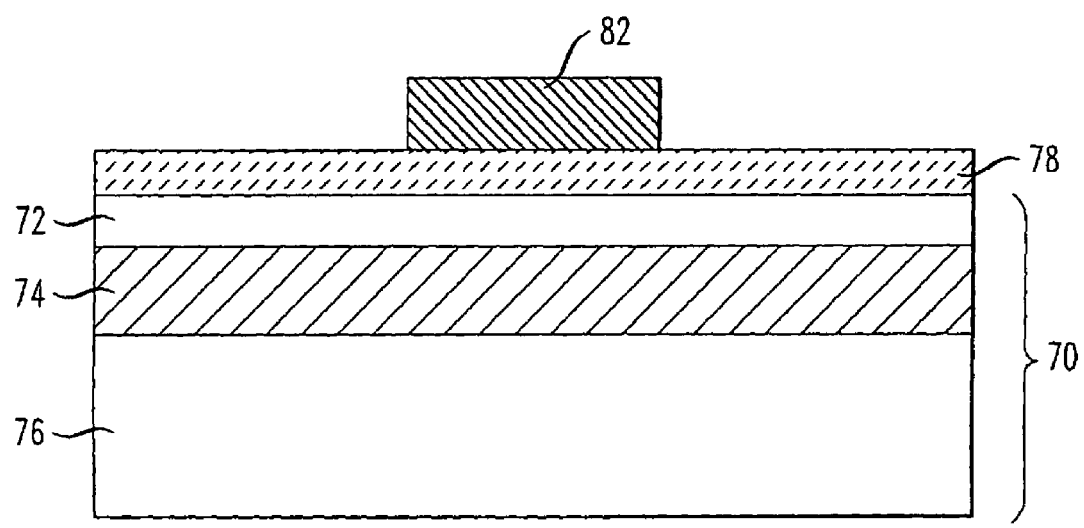
Figure 13:
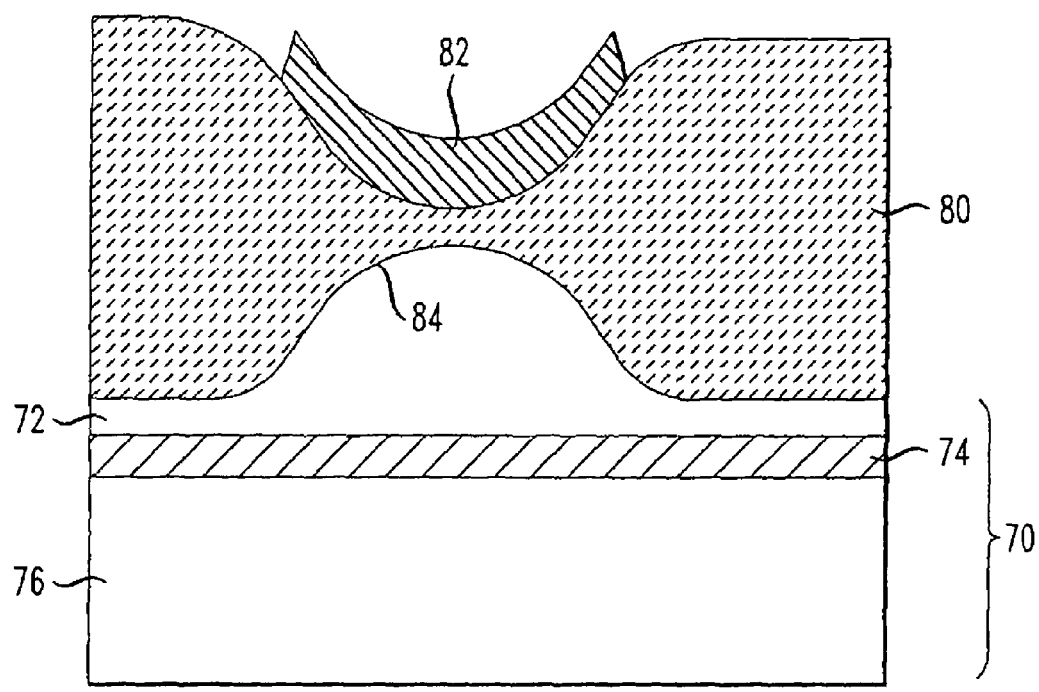
Figure 14:
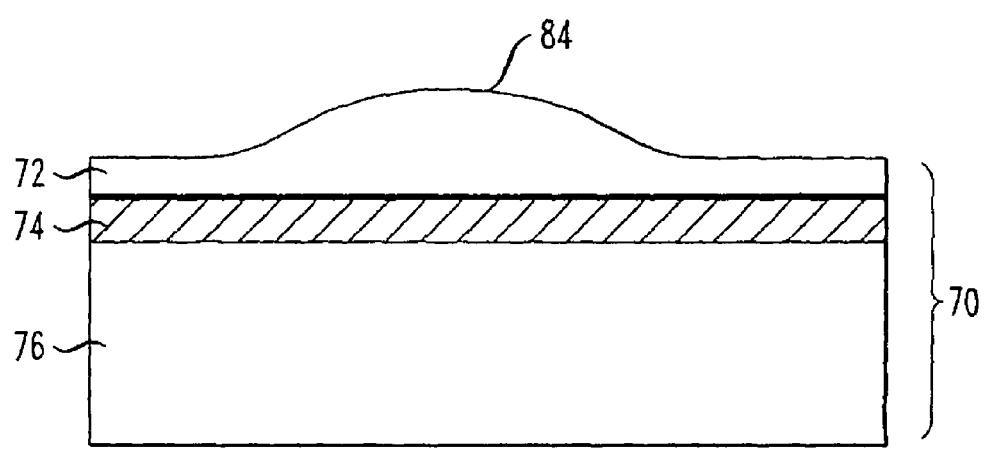

Referring to FIG. 12, layer 80 is patterned so as to remove all of material outside of the area where a waveguide (or waveguides) need to be defined. As shown in FIG. 12, a remaining portion 82 of layer 80 is defined as located in a region where a rounded rib waveguide will be formed. The next step in the process, as shown in FIG. 13, is to oxidize the structure of FIG. 12 (where, for example, a local oxidation process such as LOCOS may be used). The oxidation results in the consumption of a portion of SOI layer 72, with preferential growth of oxide 78 beyond the periphery of silicon nitride portion 82. As shown, SOI layer 72 will be transformed to include a rounded profile 84 in the waveguide area of interest. Thereafter, removal of silicon nitride portion 82 and oxide 78 results in exposing rounded waveguide 84, as shown in FIG. 14. It is to be understood that various active optical devices may be formed in the structure of FIG. 14 by the inclusion of the proper dopants and contact regions in SOI layer 72 (similar to the arrangements described above in association with FIGS. 4 and 5).

It is to be understood that the various arrangements described above are merely a few examples of optical devices (both active and passive) that may be formed using a tri-material arrangement with a rib/slab structure formed to exhibit a refractive index intermediate that of silicon and silicon dioxide. It is not possible to illustrate all of the various structures that may be formed. Indeed, the present invention is intended to be limited only by the scope of the claims appended hereto.

What is claimed is:

1. A method of forming a low loss SOI-based optical waveguiding structure, the method comprising the steps of:
   a) providing an SOI structure including a silicon substrate, an insulating layer disposed over the silicon substrate and a relatively thin silicon surface layer disposed over the insulating layer;
   b) forming a relatively thick oxide layer over the relatively thin silicon surface layer;
   c) depositing an oxide-resistant layer over the relatively thick oxide layer formed in step b);
   d) patterning the oxide-resistant layer to define a portion to be used to form the optical waveguiding structure;
   e) removing the oxide resistant layer outside of the defined portion patterned in step d) to expose the underlying relatively thick oxide layer;
   f) oxidizing the structure of step e), consuming a portion of the relatively thin silicon layer with preferential growth of the relatively thick oxide layer beyond the defined waveguiding portion to the structure, transforming the relatively thin silicon surface layer in the waveguiding portion to exhibit a relatively rounded and smooth profile; and
   g) removing the remaining oxide-resistant layer and the relatively thick oxide layer to expose the relatively rounded and smooth, low loss optical waveguiding structure formed within the relatively thin silicon surface layer.

2. The method as defined in claim 1, wherein in performing step b), a thermal oxidation process is used.

3. The method as defined in claim 1, wherein in performing step c), a silicon nitride layer is used as the oxide-resistant layer.

4. The method as defined in claim 1, wherein in performing step f), a local oxidation process is used.

5. The method as defined in claim 4, wherein the local oxidation process is LOCOS.

* * * * *